United States Patent [19]

Bianchi et al.

[11] Patent Number: 4,666,210
[45] Date of Patent: May 19, 1987

[54] DEVICE FOR CONTROLLING THE STEP-BY-STEP DISPLACEMENT OF AN ELEMENT, AND IN PARTICULAR A BACKREST OF A VEHICLE SEAT STRUCTURE

[75] Inventors: François Bianchi, Valentigney; Denis Busa, Audincourt; François Fourrey, Montbeliard, all of France

[73] Assignee: Cycles Peugeot, Valentigney, France

[21] Appl. No.: 875,897

[22] Filed: Jun. 18, 1986

[30] Foreign Application Priority Data

Apr. 9, 1986 [FR] France ................................ 86 05069

[51] Int. Cl.⁴ .......................... B60N 1/02; F16H 27/02
[52] U.S. Cl. .................................... 297/362; 297/361; 74/89.17; 74/530
[58] Field of Search ............... 297/361, 362, 366, 367, 297/372, 375, 354, 355; 74/530, 89.17; 188/67, 265

[56] References Cited

U.S. PATENT DOCUMENTS 1,142,974  6/1915  Leonhauser ...................... 74/530 X
2,859,630  11/1956 Hatch ............................. 74/89.17 X
3,133,764  5/1964  Naef ................................. 297/367
3,403,581  10/1968 Harness .............................. 74/530

FOREIGN PATENT DOCUMENTS 8102     4/1941  Fed. Rep. of Germany ...... 297/362
1498802  9/1967  France ............................. 297/362
2016642  9/1976  United Kingdom ............... 74/89.17

Primary Examiner—Kenneth J. Dorner
Assistant Examiner—Mark W. Binder
Attorney, Agent, or Firm—Sughrue, Mion, Zinn, Macpeak, and Seas

[57] ABSTRACT

The device comprises inside a housing (14) a gear pinion (10) connected to rotate solely with a control rod (12) and engaged with a rack carried by a U-section rod (6) connected to the element to be displaced. A bolt (18), formed by two yokes which are pivotable relative to each other, comprises a set of teeth (20) engaged in the locking position with the rack and is retained in its lower part in the housing, so that the axial displacement of the control rod (12) folds it in its central part and releases the rack which can be displaced with the gear pinion. The bolt is resiliently biased to the locking position as soon as the pressure exerted by the rod (12) ceases.

11 Claims, 7 Drawing Figures

DEVICE FOR CONTROLLING THE STEP-BY-STEP DISPLACEMENT OF AN ELEMENT, AND IN PARTICULAR A BACKREST OF A VEHICLE SEAT STRUCTURE

The present invention relates to a device for controlling the step-by-step displacement of an element which is more particulary, although not exclusively, adapted to be mounted on a motor vehicle seat structure, for example for adjusting the inclination of the backrest of this seat structure.

In most presently-employed motor vehicle seat structures, the device for adjusting the inclination of the backrest is mounted on the pivotal connection connecting this backrest to the seat of the seat structure. This device is controlled by means of a knob or lever which consequently is also placed in the vicinity of this pivotal connection. Such arrangements oblige the constructor to take into account in advance the position of the seat structure in the vehicle and above all to have available several types of seat structures, depending on whether the backrest must be adjustable or not.

In order to overcome this last drawback, it has now been proposed to construct motor vehicle seat strucures whose backrest framework is extended beyond its pivotal connection to the seat so that it is possible to connect the control device to this extension. However, this control device must have a small size and be easy to adapt to the support of the seat structure.

An object of the present invention is to satisfy these requirements and provides a device for controlling the step-by-step displacement of an element which is more particularly adapted to the form of the supports of motor vehicle seat structures.

This invention indeed provides a control device which comprises a housing connected to a fixed element and having extending through its centre a control member which is connected to rotate solely with a gear pinion engaged with a rack connected to the element to be displaced, and, disposed the housing, a pivotally mounted bolt provided at one end with a set of teeth cooperative with the rack and at its other end with a locking toggle system in the housing, said bolt being biased to a folded unlocking position by an axial displacement of the control member but being resiliently biased to a locking position as soon as the control member returns to its position of rest.

The device thus forms a compact structure and it will be understood that it is easy to operate since the locking and unlocking are achieved by a simple axial displacement of the control push knob.

According to a preferred embodiment, the bolt is formed by two yokes mounted around the control member and pivotally bearing against each other by two complementary curved surfaces.

Preferably, one of the yokes of the bolt carries two inwardly projecting lugs which cooperate with an outer shoulder of the control member so as to tilt the bolt.

The following description of an embodiment, given by way of a non-limiting example and shown in the accompanying drawings, will bring out the features and advantages of the invention.

Figure 1:
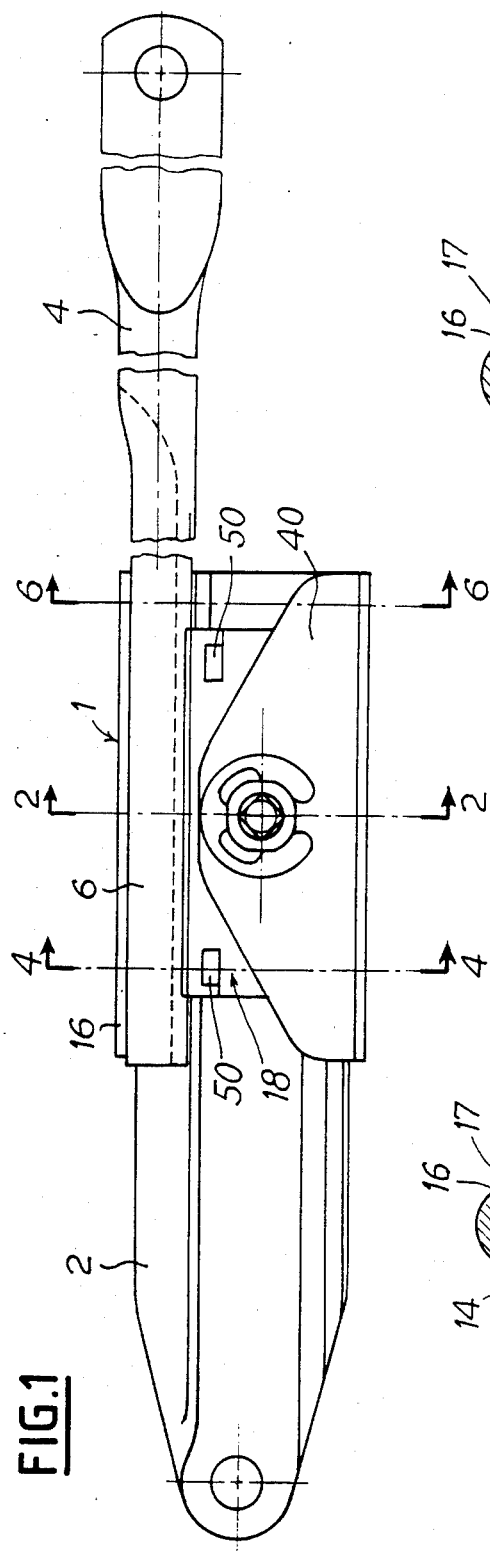
FIG. 1 is a side elevational view of a control device according to the invention.

As shown in FIG. 1, the control device according to the invention, 1, is connected on one side to a fixed element and on the other side to the element to be displaced through the medium of a side wall 2 and a rod 4. When this device is mounted on a vehicle seat structure for controlling the inclination of its backrest, the side wall 2 is fixed to the support system of the seat structure while the rod 4 is pivotally connected to the lower end of the backrest framework, or vice-versa.

Figure 3:
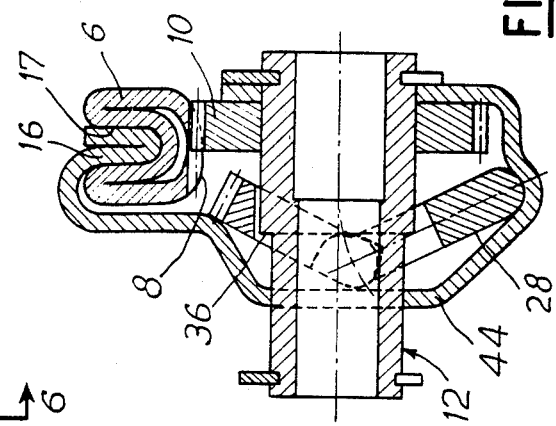
FIG. 3 is a view similar to FIG. 2 of the unlocked device.
Figure 2:
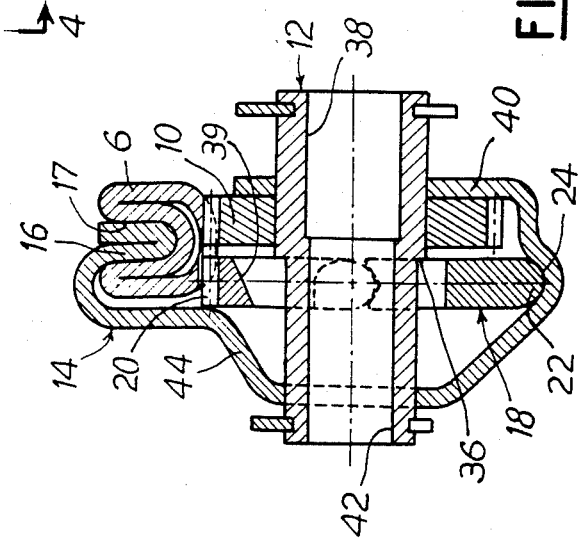
FIG. 2 is a sectional view taken on line II—II of FIG. 1 of the device in the locking position.

In the illustrated embodiment, the rod 4 is formed by a tube which comprises, in the control device 1, a deformed portion 6 so as to have a U section including a double wall (FIGS. 2 and 3). The lower side of the base of this U section 6 carries a rectilinear set of teeth or rack 8 which is engaged with a gear pinion 10 connected to rotate solely with a control rod 12.

This control rod 12 is connected at one of its ends to a push knob or the like (not shown) which enables the rod to be shifted manually. It moreover freely extends through the two opposed walls of a housing 14 which contains the gear pinion 10. In the illustrated embodiment, the housing 14 is formed by a folded sheet of metal having a section substantially in the shape of a C and including in its upper part a vertical flange 16 which fits in the longitudinal groove 17 of the U section of the bar 6 and thus constitutes a guide rail for the displacement of this bar.

Also mounted inside the housing 14 is a pivotally mounted bolt 18 having one end which carries a set of teeth 20 which is engaged with the rack 8 in the locked position, while the other end of the bolt is formed by a semi-cylindrical convex surface 22 which is received in a groove 24 of complementary shape in the housing 14. The set of teeth 20 and the cylindrical surface 22 are in fact the opposite ends of two yoke-shaped members 26 and 28 mounted in opposed directions and pivotable on each other, the facing surfaces 30 and 32 of their branches being curved in a complementary manner. In the illustrated embodiment, the lower surface 30 of the branches of the upper yoke 26 has a convex shape while the corresponding surface 32 of the lower yoke 28 has a semi-cylindrical concave shape. Further, the upper yoke 26 carries internally two cylindrical lugs 34 which are laterally in contact with an outer shoulder 36 on the control rod 12. On the other hand, the distance between the branches of the yokes 26 and 28 is such that these branches define therebetween a space 37 which is distinctly larger than the portion 38 of the largest diameter of the control rod 12. This space 37 is moreover divergent in its upper part, the inner wall 39 of the yoke 26 being upwardly inclined toward the gear pinion 10.

The gear pinion 10 is mounted on the portion 38 of large diameter of the rod 12 and is axially immobilized against the outer planar wall 40 of the housing 14. The bolt 18 is, on the other hand, mounted around the portion 42 of small diameter of the rod 12 between the gear pinion 10 and a boss 44 which projects outwardly of the housing 14.

When the device is locked, the two yokes 26 and 28 are in the extension of each other so that the cylindrical surface 22 and the set of teeth 20 are locked in the groove 24 of the housing 14 and engaged with the rack 8 respectively, so that any displacement of this rack is prevented.

If it is desired to modify the position of the element to be displaced, for example the inclination of the backrest of the seat structure of a vehicle, it is sufficient to exert a pressure on the push knob connected to the control rod 12, so as to shift the latter axially from the locking position shown in FIG. 2 to the unlocking position shown in FIG. 3. In the course of this displacement, the shoulder 36 of the rod 12 urges the lugs 34 toward the end of the boss and produce a relative tilting between the yokes 26 and 28. The set of teeth 20 then leaves the rack 8 and the cylindrical surface 22 pivots in the locking groove 24. The wall 39 comes almost into bearing relation to the control rod 12 and the projections 34 abut against the end of the boss 44. The rack 8 is then released and the rod 12 can be driven in rotation, which rotates the gear pinion 10 and shifts the rack 8 axially.

Figure 4:
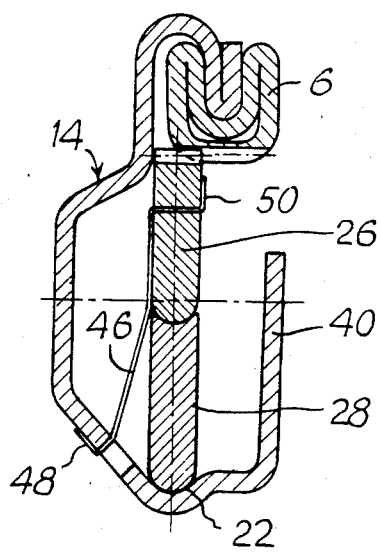
FIG. 4 is a sectional view taken on line IV—IV of FIG. 1.
Figure 5:
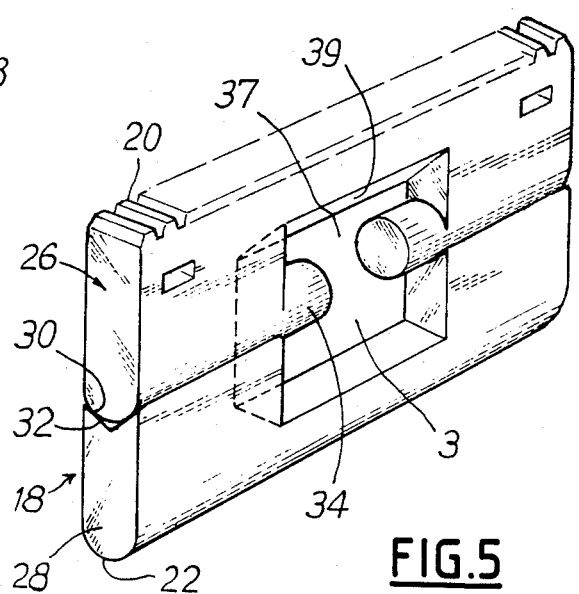
FIG. 5 is a perspective view to an enlarged scale of the bolt of the device of the invention.

As soon as the pressure on the control rod 12 ceases, a spring 46 returns the bolt 18 to the locking position. This spring 46 (FIG. 4) is for example constituted by a metal strip fixed at one of its ends 48 to the housing 14 and extending in the vicinity of its upper part through the lateral branch of the upper yoke 26 so as to be fixed to the opposed surface of this yoke at 50. Preferably, a spring 46 is mounted in each of the branches of the yoke 26, i.e. at each of the ends of the bolt 18.

Figure 6:
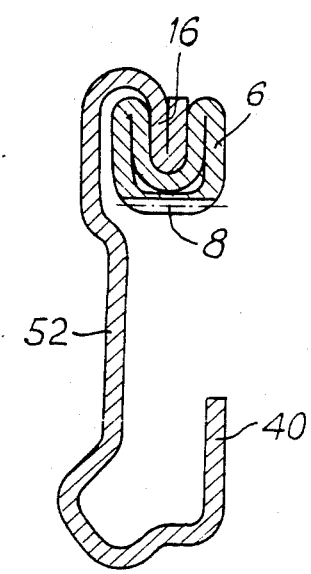
FIG. 6 is a sectional view taken on line VI—VI of FIG. 1.
Figure 7:
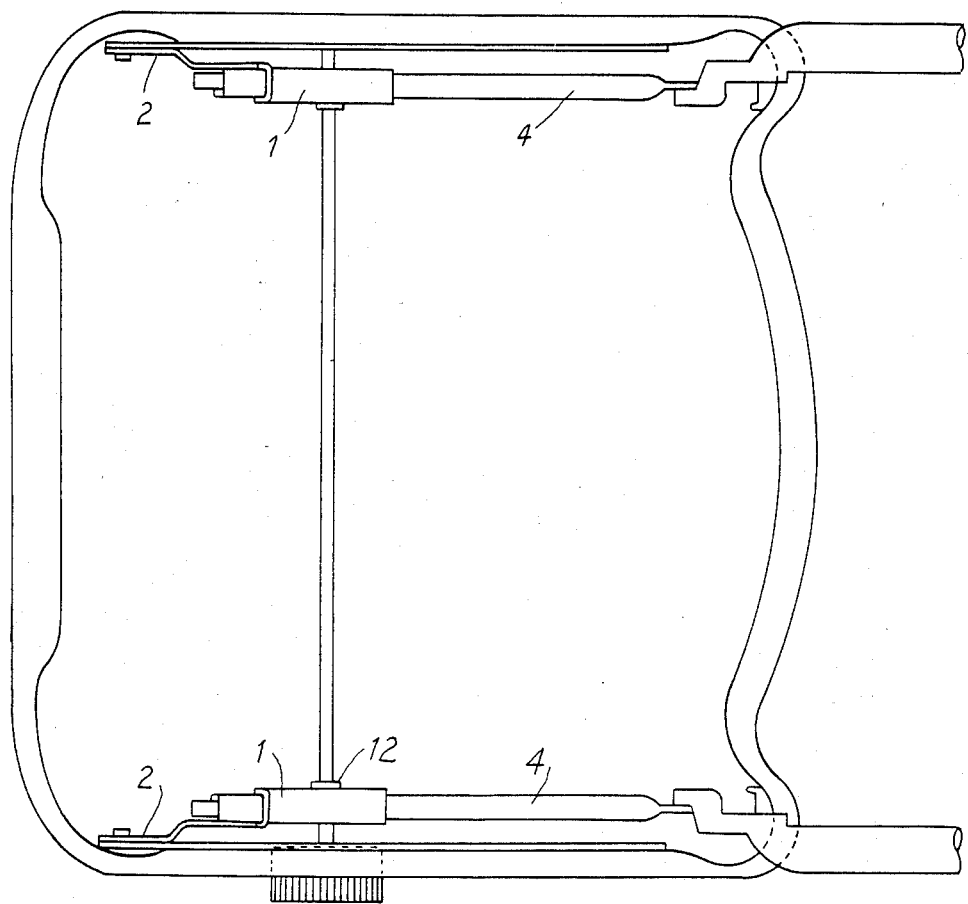
FIG. 7 is a plan view of a seat structure including a control device on each side of a backrest.

Preferably, and as shown in FIG. 6, the boss 44 has a length substantially equal to that of the bolt 28 and the wall of the housing 14 is inwardly driven in at each of the ends of this boss at 52 so as to reinforce the stiffness of the device.

When the element to be displaced is a seat structure of a vehicle or the like, a device 1 is mounted on each side of the seat structure and the two devices are interconnected by a bar rigid with the two control rods 12 so that a single push knob causes the strictly simultaneous displacement of the two rods 4. Preferably, the rod 12 is formed by a tube, as shown, and the connecting bar for the two devices extends through the two rods 12 and is rigid therewith.

According to a modification, the push knob is replaced by a control member of only the displacement in translation of the rod or rods 12, for example a lever which is simply in contact with the end of one of the rods. This lever controls the unlocking and thus permits the user to shift his seat structure forwardly or rearwardly through the desired distance. The racks 8 then rotate the gear pinions 10 which drive the rods 12 and thus ensure the synchronization of the displacements of the two sides of the seat structure. The locking is, as before, brought about automatically by the springs 46.

In any case, the control of the element to be displaced may thus be achieved in a simple manner from the most appropriate point owing to a control device which may be mounted upon construction, in particular that of a vehicle seat structure, or subsequently without necessitating great modifications of the assembly.

What is claimed is:

1. A device for controlling the step-by-step displacement of a movable element, for example a vehicle seat structure, said device comprising said movable element, a fixed element, a housing connected with the fixed element, a control member extending through substantially the center of the housing, a gear pinion slidably mounted on the control member but prevented from rotating relative to the control member, a rack connected to said movable element and engaged with the gear pinion and, inside the housing, a pivotally assembled foldable bolt structure having at a first end a set of teeth cooperative with the rack, a groove in the housing for engaging and retaining a second end opposed to said first end of the bolt structure, the control member being combined with the bolt structure in such manner as to shift the bolt structure to a folded-up position for unlocking by an axial displacement of the control member and means for biasing the bolt structure to a locking position as soon as the control member returns to its position of rest.

2. A device according to claim 1, wherein the pivotally assembled bolt structure comprises two yokes mounted to extend in opposite directions about the control member and bearing against each other by two curved surfaces of complementary shape.

3. A device according to claim 1, wherein the control member has an outer shoulder and the bolt structure is hollowed out in its central part and comprises two inner lugs which cooperate with the outer shoulder of the control member for the purpose of the folding up of the bolt structure by an axial displacement of the control member for unlocking.

4. A device according to claim 1, wherein the housing forms an internal groove for receiving a cylindrical lower portion of the bolt structure.

5. A device according to claim 1, comprising a rod carrying the rack and defining a longitudinal groove, the housing being bent in an upper part thereof so as to form a guide rail which extends into the longitudinal groove of the rod carrying the rack.

6. A device according to claim 5, wherein the rod carrying the rack has a double-walled U-shaped cross section defining the longitudinal guide groove.

7. A device according to claim 1, comprising a return spring formed by a strip fixed in a lower portion of the strip to the housing and in an upper portion of the strip to a side of the bolt structure in the vicinity of the teeth of the latter.

8. A device according to claim 2, wherein the upper yoke has two branches and a return spring is interposed between each of the branches of the upper yoke and the housing for biasing the bolt structure to an unfolded locking position of the bolt structure.

9. A device according to claim 1, wherein the control member comprises a rod and a push knob which is fixed to the rod so as to move axially with and to rotate with said rod.

10. A device according to claim 1, wherein the control member comprises a rod and an unlocking lever is associated with said rod for producing the axial displacement of the rod.

11. A device according to claim 1, in combination with a seat structure comprising a seat and a backrest pivotably connected to the seat, said fixed element being said seat, the housing being connected to the seat and the rack being pivotally connected to the backrest which is said movable element, a second control device substantially identical to said control device being provided on an opposite side of the seat and a bar interconnecting the control members of the two control devices ensuring the synchronization of the displacements of both sides of the seat structure.

* * * * *